(12) United States Patent
Kweon et al.

(10) Patent No.: US 11,657,495 B2
(45) Date of Patent: May 23, 2023

(54) NON-LAMBERTIAN SURFACE INSPECTION SYSTEM USING IMAGES SCANNED IN DIFFERENT DIRECTIONS

(71) Applicant: HIVE VISION CO., LTD., Uiwang-si (KR)

(72) Inventors: In Soo Kweon, Uiwang-si (KR); Yeo Hak Yoon, Uiwang-si (KR); Ung Jun Chun, Uiwang-si (KR); Su Yeol Park, Bucheon-si (KR)

(73) Assignee: HIVE VISION CO., LTD., Uiwang-si (KR)

( * ) Notice: Subject to any disclaimer, the term of this patent is extended or adjusted under 35 U.S.C. 154(b) by 0 days.

(21) Appl. No.: 17/485,638

(22) Filed: Sep. 27, 2021

(65) Prior Publication Data
US 2022/0101516 A1    Mar. 31, 2022

(30) Foreign Application Priority Data
Sep. 28, 2020    (KR) .................. 10-2020-0126330

(51) Int. Cl.
*G06T 7/00* (2017.01)
*G06T 7/586* (2017.01)
(Continued)

(52) U.S. Cl.
CPC .............. *G06T 7/0006* (2013.01); *G06T 5/40* (2013.01); *G06T 7/33* (2017.01); *G06T 7/35* (2017.01);
(Continued)

(58) Field of Classification Search
None
See application file for complete search history.

(56) References Cited

U.S. PATENT DOCUMENTS

| 9,466,000 B2 * | 10/2016 | Bhanu ................. G06V 20/584 |
| 2010/0245813 A1 * | 9/2010 | Margalit .............. G01N 21/956 |
| | | 356/237.5 |

(Continued)

FOREIGN PATENT DOCUMENTS

| CN | 109804238 A | * | 5/2019 | ............. G01B 11/30 |
| FR | 3026217 A1 | * | 3/2016 | ............. G10D 13/02 |
| KR | 10-0824808 | | 4/2008 | |

(Continued)

OTHER PUBLICATIONS

English Translation of KR102135472B provided by STIC (Year: 2020).*

(Continued)

*Primary Examiner* — Tyler W. Sullivan
(74) *Attorney, Agent, or Firm* — Lex IP Meister, PLLC

(57) ABSTRACT

A non-Lambertian surface inspection system for line scan is proposed. Such a system includes: a surface inspection part including a frame provided with a curved mounting hole formed on at least one of one surface and the other surface thereof and a photographing hole formed at an upper end thereof, and a plurality of first and second illumination modules installed in the mounting hole and output light in oblique lines toward an inspection object placed on a bottom surface thereof; a camera positioned above the photographing hole to photograph the inspection object positioned on the bottom surface through the photographing hole and receive an entire reception image including first and second illumination images; and a controller to control operation of the camera, selectively operate the first illumination module and the second illumination module, and extract the first illumination image and the second illumination image.

3 Claims, 21 Drawing Sheets

(51) Int. Cl.
*G06T 7/33* (2017.01)
*G06T 7/35* (2017.01)
*G06T 7/60* (2017.01)
*G06T 5/40* (2006.01)
*G06T 7/44* (2017.01)
*G06V 30/19* (2022.01)

(52) U.S. Cl.
CPC .............. *G06T 7/44* (2017.01); *G06T 7/586* (2017.01); *G06T 7/60* (2013.01); *G06V 30/19073* (2022.01); *G06T 2207/10152* (2013.01); *G06T 2207/30164* (2013.01)

(56) References Cited

U.S. PATENT DOCUMENTS

2011/0267483 A1* 11/2011 Kanamori ................. G06T 1/00
348/240.1
2019/0213729 A1* 7/2019 Kato .................... G02B 6/0073

FOREIGN PATENT DOCUMENTS

| KR | 2135472 B1 * | 7/2020 | |
|---|---|---|---|
| WO | WO-2018088423 A1 * | 5/2018 | ............ G01B 11/30 |

OTHER PUBLICATIONS

English Translation of CN109804238A provided by STIC (Year: 2019).*
English Translation of FR3026217A1 provided by STIC (Year: 2016).*

* cited by examiner

10

I

10

I

NON-LAMBERTIAN SURFACE INSPECTION SYSTEM USING IMAGES SCANNED IN DIFFERENT DIRECTIONS

CROSS REFERENCE TO RELATED APPLICATION

The present application claims priority to Korean Patent Application No. 10-2020-0126330, filed Sep. 28, 2020, the entire contents of which is incorporated herein for all purposes by this reference.

BACKGROUND OF THE INVENTION

Field of the Invention

The present invention relates to a technique for inspecting product surfaces by using a line scan camera.

Description of the Related Art

The industries of portable IT devices such as smartphones, tablet PCs, and laptops, as well as the industries of electric vehicles, hybrid cars, and the like are rapidly developing. Such industries have led to several additional industries. For example, as the types of smart phones increase and the use cycles of smart phones shorten, the industry for a system that quickly and accurately inspects various types of smart phones is growing.

Accordingly, the market for systems that detects external defects of smartphone cover glass is also gradually increasing.

To date, the defects of smartphone cover glass are tested by way of using an area scan camera and a line scan camera to inspect the appearance and surfaces of a subject in a simple illumination method.

With a simple structure and low cost, such an appearance and surface inspection system may merely inspect only limited types of defects and a limited shape of models, but is currently widely used because there is no suitable alternative.

A conventional surface inspection system is unable to control illumination directions and amounts of light suitable for models having various curved shapes, so surface inspection is not possible due to a glare phenomenon, that is, a phenomenon in which a surface to be inspected is reflected white, or detection of defects, which are visible only in light emitted in a particular direction, is unable to be performed.

DOCUMENTS OF RELATED ART (Patent Document 1) Korean Patent No. 10-0824808 (Published on Apr. 24, 2008)

SUMMARY OF THE INVENTION

An objective of the present invention is to solve a problem that when inspecting a curved surface of a subject, it is not possible to accurately inspect a surface state of an inspection object due to occurrence of a glare phenomenon.

The technical problems of the present invention are not limited to the above-mentioned technical problems, and other technical problems not described above will be clearly understood by those skilled in the art from the description of the claims.

A non-Lambertian surface inspection system for line scan of the present invention for achieving the above technical objective includes: a surface inspection part including a frame module provided with a curved mounting hole formed on at least one of one surface and the other surface thereof and a photographing hole formed at an upper end thereof, and a plurality of first and second illumination modules and installed in the mounting hole and output light in oblique lines toward an inspection object placed on a bottom surface thereof; a camera part positioned above the photographing hole, and configured to photograph the inspection object positioned on the bottom surface through the photographing hole and generate an entire composite image including a first illumination image and a second illumination image; and a controller configured to control operation of the camera part, selectively operate the first illumination module and the second illumination module, and receive the first illumination image and the second illumination image from the entire reception image photographed by the camera part, wherein the controller may be configured to turn on the first illumination module for a preset time and then turn off the first illumination module, turn on the second illumination module when the first illumination module is turned off, receive the first illumination image photographed through the camera part when the first illumination module is turned on, and receive the second illumination image photographed through the camera part when the second illumination module is turned on, the controller may include: an illumination image reception module configured to receive the first illumination image and the second illumination image, which are photographed by the camera part, into areas of preset rows or columns; an alignment module configured to align a partial image of a plurality of rows or columns of the first illumination image with a partial image of the plurality of rows or columns of the second illumination image; a histogram module configured to divide the first illumination image and the second illumination image into a plurality of blocks, assign a position number to each block, and extract a reflectivity value of each block; a removal module configured to compare a preset reference reflectivity value with the reflectivity value measured in each block, and delete each block having the reflectivity value greater than the reference reflectivity value; and a block correction image module configured to receive each block in a same position as each deleted block of the first illumination image from the second illumination image to generate a first block correction image by mapping the first illumination image when each block having the reflectivity value greater than the reference reflectivity value in the first illumination image is deleted, and receive each block in the same position as each deleted block of the second illumination image from the first illumination image to generate a second block correction image by mapping the second illumination image when each block having the reflectivity value greater than the reference reflectivity value in the second illumination image is deleted, the controller may further include a composite image generation module configured to synthesize the first block correction image and the second block correction image after calculating the same according to the preset formula, so as to generate the composite images, the composite image generation module may be configured to process the composite image into an albedo image in a setting area of the composite image, process the composite image into an X-axis partial differential image obtained by calculating a change amount of a surface height of the inspection object in an X-axis direction in the composite image, process the composite image into a Y-axis partial differential image obtained by calculating a change amount of the surface height of the inspection object in a Y-axis direction in the composite image, or process the X-axis partial differential image and the Y-axis partial differential image into a second partial differential image obtained by respectively calculating the change amounts of the surface height of the inspection object in the X-axis direction and the Y-axis direction.

The frame module may be provided in a shape included in a hemispherical shape.

The frame module may further include a reflection plate installed on an upper surface thereof.

The frame module may further include: a light-transmission plate installed in the photographing hole and provided with a dot pattern formed on the upper surface thereof and configured to reflect the light downward; and a plurality of auxiliary illumination modules installed on sides of the light-transmission plate to emit the light to inside the light-transmission plate, wherein luminance of each auxiliary illumination module may be controlled through the controller.

The present invention uses a line scan camera and a plurality of illumination sources capable of leaning at various angles to utilize reflectivity and shadows depending on illumination directions, so that a problem of the conventional surface inspection system, that is, a problem of the glare phenomenon occurring when inspecting surfaces of a model having a curved shape is prevented from occurring.

Furthermore, in the present invention, illumination sources configured to emit light at specific angles are operated in response to curved surfaces of a subject, so that a variety of images with different characteristics may be obtained from the subject, the variety of images including: an x-axis partial differential image, a y-axis partial differential image, a norm image, an albedo Image, a secondary partial differential image, and the like. In addition, the present invention may make it possible to increase efficiency of inspection by selecting and synthesizing these images according to objects to be measured and inspected.

In addition, in particular, in objects contaminated with soot and carbonization in industrial sites where welding and the like are performed, the present invention may accurately detect black contamination, black scratches, and scratches such as flaws formed on a subject. In particular, for the scratches and flaws affected by illumination directions, the present invention may exhibit a much higher detection performance than that of the conventional surface inspection system.

In addition, compared to a method of indirectly and passively using reflected and scattered light through a conventional dome-shaped structure, the present invention may effectively reduce the size of the structure, while controlling strength (i.e., intensity) of the scattered light separately, so that the present invention may control the noise of surface inspection images more efficiently.

DETAILED DESCRIPTION OF THE INVENTION

The drawings shown in the present specification and the description based on the drawings are one example that allows those skilled in the art to easily understand the present invention. Accordingly, the drawings of the present invention and the detailed description for implementing the invention do not limit the scope of the present invention. The scope of claims of the present invention may be defined solely by the claims.

Hereinafter, a non-Lambertian surface inspection system for line scan of the present invention will be described with reference to the drawings of the following exemplary embodiments of the present invention. However, in order to make the description of the present invention clear and concise, first, the non-Lambertian surface inspection system for line scan will be generally described with reference to FIGS. 1 and 2. In addition, components constituting the non-Lambertian surface inspection system for line scan will be described with reference to FIGS. 3 to 7.

Figure 1:
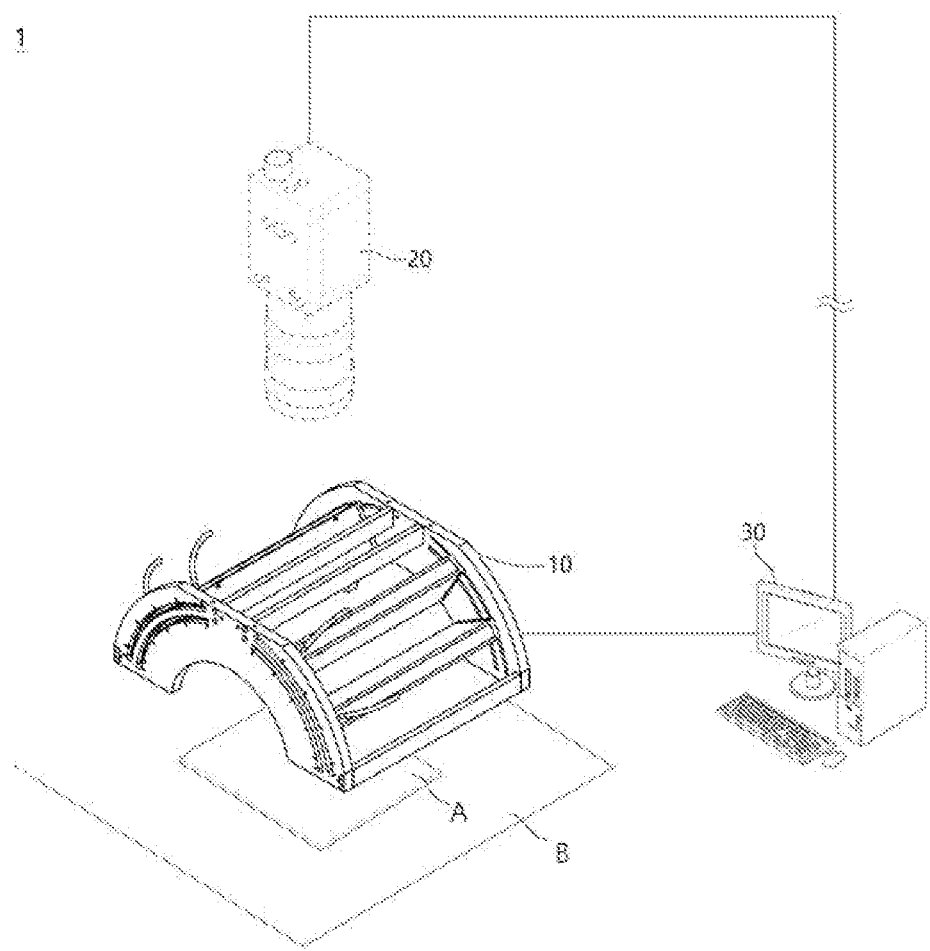
FIG. 1 is a use state diagram illustrating a non-Lambertian surface inspection system for line scan according to an exemplary embodiment of the present invention.
Figure 2:
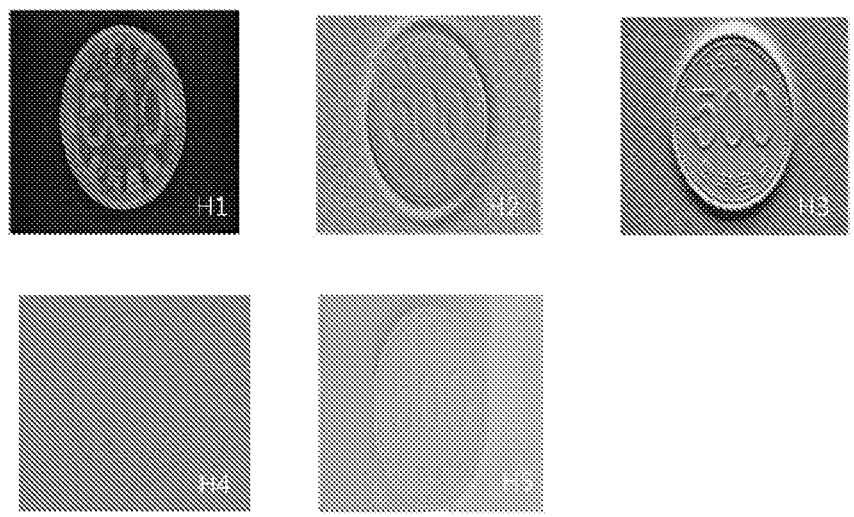
FIG. 2 is a view illustrating a plurality of block correction images actually obtained through the non-Lambertian surface inspection system for line scan according to the exemplary embodiment of the present invention.

FIG. 1 is a use state diagram illustrating a non-Lambertian surface inspection system for line scan according to an exemplary embodiment of the present invention, and FIG. 2 is a view illustrating a plurality of composite images used for final inspection through the non-Lambertian surface inspection system for line scan according to the exemplary embodiment of the present invention.

The non-Lambertian surface inspection system 1 for line scan of the present invention includes, as components, a surface inspection part 10, a camera part 20, and a controller 30, wherein the surface inspection part 10 and the camera part 20 are operated by the controller 30. In this case, in a plurality of illumination modules included in the surface inspection part 10, light is output in a predetermined order by a predetermined combination in accordance with operation of the controller 30, and a reflection plate 113 causes the light that is output and scattered from each illumination module 121 to 124 to illuminate an inspection object A again.

Furthermore, the controller 30 of the non-Lambertian surface inspection system 1 for line scan operates the camera part 20 in accordance with the operation of the illumination modules, so as to photograph the inspection object A, whereby an entire reception image C that is received from the camera part 20 and includes surface information generated while photographing the inspection object A by illumination in multiple directions is obtained.

Figure 11:
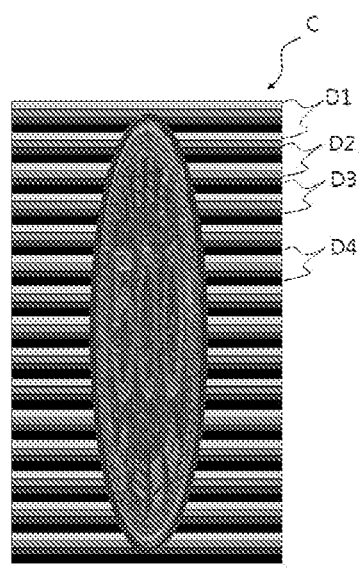
Figure 12:
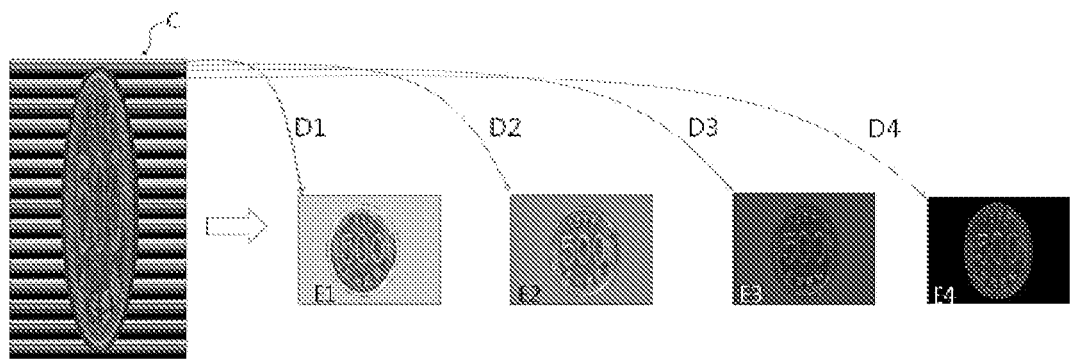

In this case, the entire reception image C may be transformed into a plurality of illumination images E1 to E4 (refer to FIG. 11) through line-by-line images D1 to D4, which are suitable for each illumination characteristic included therein.

In this case, the controller 30 of the non-Lambertian surface inspection system 1 for line scan performs dividing the generated plurality of illumination images E1 to E4 into areas of rows or columns, aligning a plurality of areas of the rows or columns, generating individual images F1 to F4, dividing each image F1 to F4 (refer to FIG. 13) into a plurality of blocks, calculating a reflectivity value of each block, comparing each reflectivity value with a preset reference reflectivity value, and then removing each block having a reflectivity value greater than the reference reflectivity value. In addition, each block corresponding to a removed part is interpolated from other valid images to generate a block correction image.

Here, block correction images G1 to G4 may be formed by corresponding to the number of illumination modules 121 to 124. For example, when there are four illumination modules, a first block correction image G1 to a fourth block correction image G4 may be generated.

Thereafter, the non-Lambertian surface inspection system 1 for line scan may generate a composite image H by synthesizing at least two of the generated plurality of block correction images G1 to G4. More specifically, as shown in FIG. 2, by synthesizing at least two of the first block correction image G1 to the fourth block correction image G4, an albedo image H1, a partial differential image H2 in the X direction, a partial differential image H3 in the Y direction, a second partial differential image H4, and a normal vector image H5 may be processed.

In this way, referring to FIGS. 1 to 13, the non-Lambertian surface inspection system 1 for line scan according to the present invention uses the camera part 20 and a plurality of illumination modules 121 to 124 capable of leaning at various angles to utilize reflectivity and shadows depending on illumination directions, so that a problem of the conventional surface inspection system, that is, a problem of having a glare phenomenon is prevented from occurring when inspecting surfaces of a curved model.

Furthermore, the non-Lambertian surface inspection system 1 for line scan according to the present invention selects and synthesizes these images according to the object to be measured and inspected, so as to improve the reliability of inspection of the inspection object.

In this way, particularly, in the objects contaminated with soot and carbonization in industrial sites where welding and the like are performed, the non-Lambertian surface inspection system 1 for line scan may accurately detect black contamination, black scratches, and scratches such as flaws formed on the inspection object A.

Herein after, the components constituting the non-Lambertian surface inspection system for line scan will be described with reference to FIGS. 3 to 7.

Figure 3:
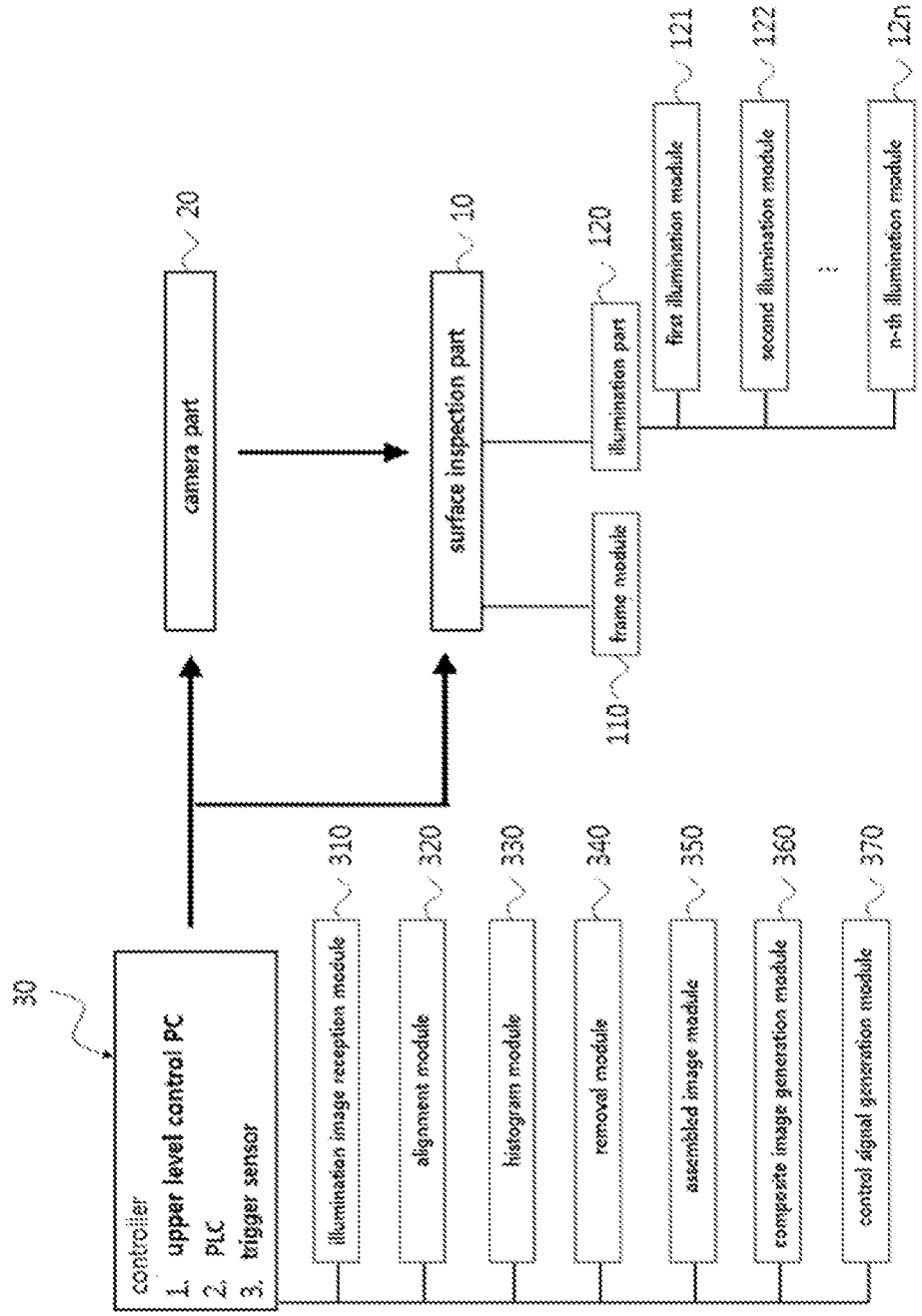
FIG. 3 is a block diagram illustrating the non-Lambertian surface inspection system for line scan according to the exemplary embodiment of the present invention.
Figure 4:
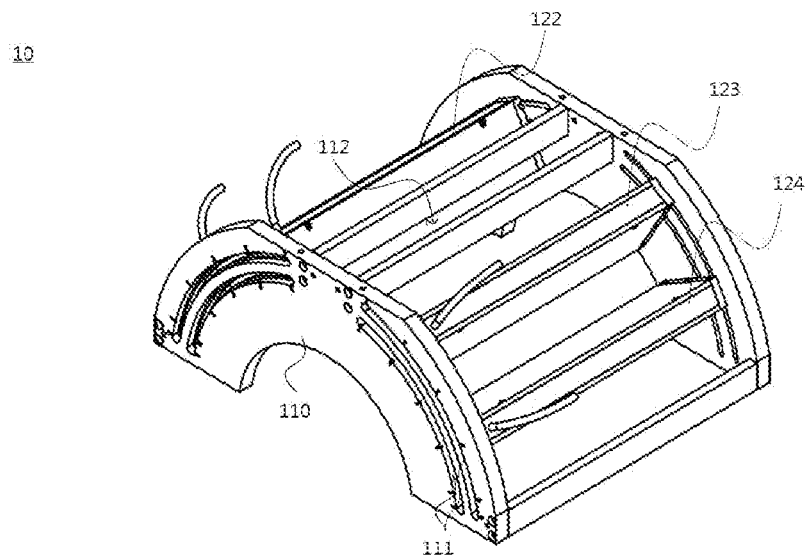
FIG. 4 is a perspective view illustrating a surface inspection part of FIG. 1.
Figure 5A:
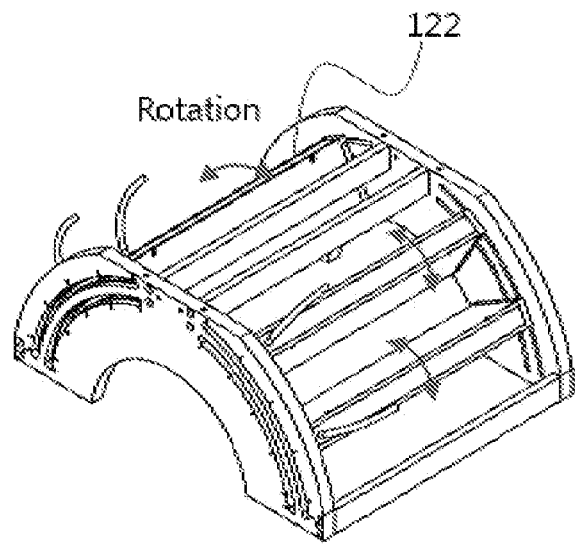
FIGS. 5A to 5C are views illustrating a state in which illumination modules installed in a frame module of FIG. 4 are rotated and a state in which light is output in oblique lines from a first illumination module and a second illumination module.
Figure 5B:
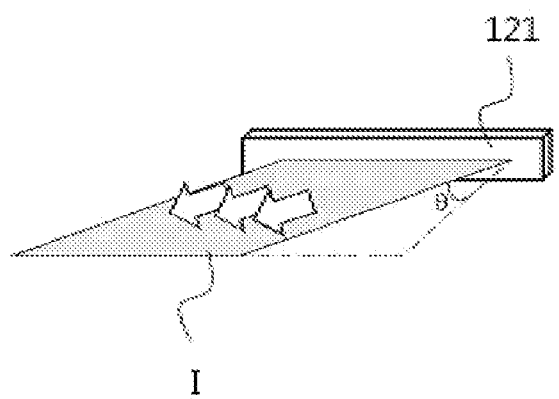
Figure 5C:
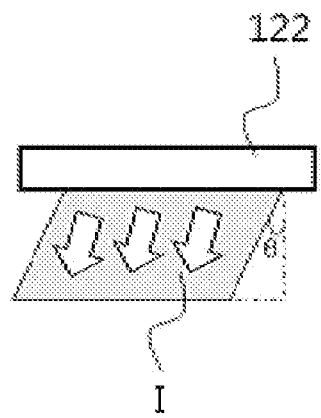
Figure 6:
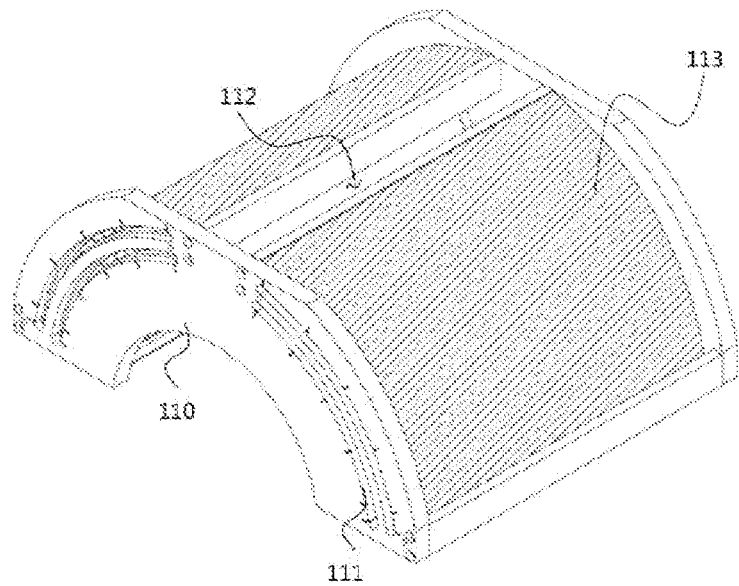
FIG. 6 is a view illustrating the surface inspection part in a state in which a reflection plate is installed on the frame module of FIG. 4.
Figure 7:
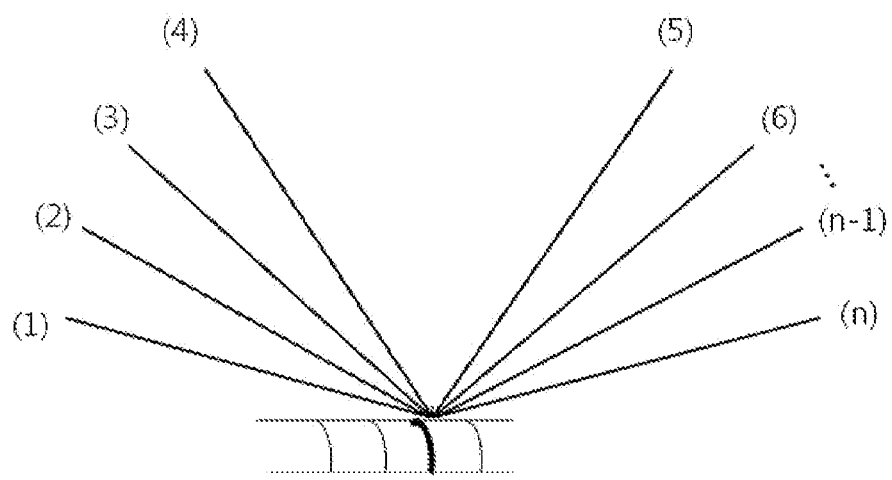
FIG. 7 is a view schematically illustrating a plurality of illumination modules installed in the frame module of FIG. 4.

FIG. 3 is a block diagram illustrating the non-Lambertian surface inspection system for line scan according to the exemplary embodiment of the present invention, and FIG. 4 is a perspective view of the surface inspection part of FIG. 1. In addition, FIGS. 5A to 5C are views illustrating a state in which illumination modules installed in a frame module of FIG. 4 are rotated and a state in which light is output in oblique lines from a first illumination module and a second illumination module, and FIG. 6 is a view illustrating the surface inspection part in a state in which a reflection plate is installed on the frame module of FIG. 4. In addition, FIG. 7 is a view schematically illustrating a plurality of illumination modules installed in the frame module of FIG. 4.

The surface inspection part 10 is a device capable of emitting light at various angles to an inspection object A so that the camera part 20 may photograph the inspection object A. Such a surface inspection part 10 is formed in a shape included in a hemispherical shape, and includes: a frame module 110 having a photographing hole 112 formed on an upper end thereof; and illumination modules installed in the frame module 110 to rotate and move.

Here, as shown in FIG. 4, a mounting hole 111 having a curved shape is formed on at least one of one surface and the other surface of the frame module 110, and a plurality of illumination modules that outputs light, in oblique lines, to the inspection body A placed on a bottom surface of the frame module 110 is installed in the mounting hole 111.

In this case, the plurality of illumination modules is used for illumination of a shadow-metric system (SMS) optimized for line scan. In the present specification, in order that the description of the present invention may be concise and clear, it is assumed that the plurality of illumination modules installed in the surface inspection part 10 includes a first illumination module 121, a second illumination module 122, a third illumination module 123, and a fourth illumination module 124. In this case, the first illumination module 121, the second illumination module 122, the third illumination module 123, and the fourth illumination module 124 may be used for illumination of the shadow-metric system (SMS) optimized for line scan. As shown in FIG. 5A, the first illumination module 121 to fourth illumination module 124 may be selectively rotated in the mounting hole 111, and as shown in FIGS. 5B and 5C, light may be output in a 45 degree tilted state.

In addition, as shown in FIG. 6, the reflection plate 113 installed on the upper surface of the frame module 110 is included so as to reflect the scattered light output from the plurality of illumination modules, whereby the reflected light may be emitted to the inspection object A again. In this case, the first illumination module 121 is installed at a lower end of the mounting hole 111 on the left, and the second illumination module 122 is spaced apart from the first illumination module 121 and installed on an upper end of the mounting hole 111 on the left. In addition, the third illumination module 123 is installed on the upper end of the mounting hole 111 on the right, and the fourth illumination module 124 is spaced apart from the third illumination module 123 and installed at the lower end of the mounting hole 111 on the right.

In this way, the first illumination module 121 to the fourth illumination module 124 mounted in the mounting hole 111 and spaced apart from each other may rotate at each installed position and emit light to the inspection object A in various directions. In addition, the first illumination module 121 to the fourth illumination module 124 may emit the light to the inspection object A at various positions while moving along the mounting hole 111.

The camera part 20 is positioned above the photographing hole 112, photographs the inspection object A placed on the bottom surface B through the photographing hole 112, and receives the entire reception image C including the first illumination image E1 and the second illumination image E2.

More specifically, the camera part 20 may be installed at a position above the photographing hole 112 so that a lens is placed at a position overlapping the photographing hole 112. Such a camera part 20 photographs the inspection object A positioned on the bottom surface through the photographing hole 112, and generates an illumination image.

Referring to FIGS. 1 to 13, such a camera part 20 is operated by a control signal output from the controller 30. In particular, the camera part 20 may operate in synchronization with operation of the illumination modules 121 to 124 and only operate when the illumination modules 121 to 124 are turned on, whereby the inspection object A may be photographed.

In such a camera part 20, when the first illumination module 121, the second illumination module 122, the third illumination module 123, and the fourth illumination module 124 are combined and turned on in a specified order according to the inspection object, the first illumination image E1 to the fourth illumination image E4 may be generated. For example, in the camera part 20, the first illumination image E1 is photographed when the first illumination module 121 is turned on, the second illumination image E2 is photographed when the second illumination module 122 is turned on, the third illumination image E3 is photographed when the third illumination module 123 is turned on, and the fourth illumination image E4 is photographed when the fourth illumination module 124 is turned on.

The controller 30 is a computer that performs generating a control signal, receiving data, and processing the data. Such a controller 30 may control the illumination time and delay time in nanosecond units when controlling cross-illumination by using the line scan. Such a controller 30 includes a separate control board on which a FPGA chip is mounted due to a limitation of the control board using the conventional microcontroller CPU.

Therefore, depending on the inspection object, the controller 30 may directly reflect, in a program, a problematic situation such as the illumination sequence, frequency division, noise removal, and the like in a site. In addition, as shown in FIG. 3, the controller 30 may be operated by including an illumination image reception module 310, an alignment module 320, a histogram module 330, a removal module 340, a block correction image module 350, a composite image generation module 360, a control signal generation module 370, etc.

Such a controller 30 generates a control signal from the control signal generation module 370 and may operate the plurality of illumination modules 12 and the camera part 20. For example, the controller 30 turns on the first illumination module 121 for a set time and then turns it off, and turns on the second illumination module 122 when the first illumination module 121 is turned off. In addition, when the second illumination module 122 is turned off, the third illumination module 123 is turned on, and when the third illumination module 123 is turned off, the fourth illumination module 124 may be turned on.

The controller 30 turns on and off the first illumination module 121 to the fourth illumination module 124, and may turn on the first illumination module 121 to the fourth illumination module 124. In accordance with inspection speed efficiency during every line scan, the controller 30 may periodically turn on illumination by adjusting luminance of the illumination and excluding each specific illumination according to a preset standard. For example, for an inspection object A, the first illumination module 121, the second illumination module 122, and the fourth illumination module 124 are sequentially turned on and the first illumination image, the second illumination image, and the fourth illumination image may be generated. For an inspection object B, the first illumination module 121, the second illumination module 122, and the third illumination module 123 are sequentially turned on and the first illumination image, the second illumination image, and the third illumination image may be generated.

In addition, the controller 30 operates the camera part 20, generates the first illumination image to the fourth illumination image, and receives each generated illumination image. The controller 30 processes the illumination images, and may generate the processed images, that is, an albedo image H1, a partial differential image H2 in the X direction, a partial differential image H3 in the Y direction, a second partial differential image H4, and a normal vector image H5.

More specifically, the controller 30 obtains the entire reception image C including a plurality pieces of image information from the camera part 20 through the illumination image reception module 310. In addition, by selectively extracting image divisions D1 to D4 for each illumination group from the entire reception image C, the first illumination image E1 to the fourth illumination image E4 are generated and divided into areas of rows or columns, the areas being set for the images.

In addition, through the alignment module 320, partial images D1 to D4 of a plurality of rows or columns of the first illumination image E1 and partial images D1 to D4 of a plurality of rows or columns of the second illumination image E1 are aligned. In addition, the histogram module 330 is divided into blocks of the same size, a position number is assigned to each block, and a reflectivity value of each block is extracted. In addition, the reference reflectivity value preset through the removal module 340 and the reflectivity value measured in each block are compared to delete a block having a reflectivity value greater than the reference reflectivity value. In addition, through the block correction image module 350 and the removal module 340, the block corresponding to a part in which the block is removed is interpolated from other valid images, so as to generate the first block correction image G1 and the second block correction image G2.

Figure 13:
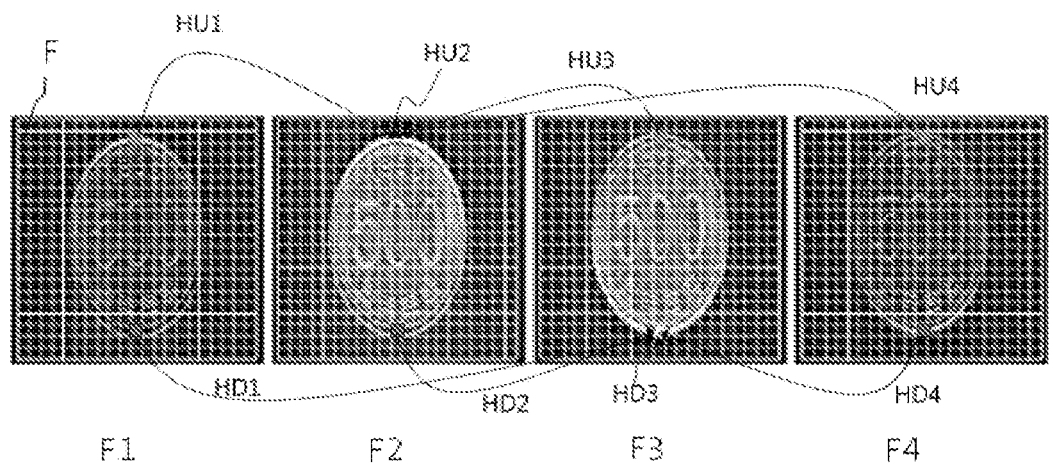

For example, referring to FIG. 13, when the reflectivity value of HU2 of a first block of a second illumination image is greater than or equal to the reference reflectivity value, the reflectivity value of HU2 that is the first block of the second illumination image is changed into zero. In addition, an average value of the reflectivity value of HU1 that is a first block of a first illumination image, the reflectivity value of HU3 that is a first block of a third illumination image, and the reflectivity value of HU4 that is a first block of a fourth illumination image is reflected to HU2 that is a first block of a second illumination image.

In addition, when the reflectivity value of HD2 that is a second block of the third illumination image is greater than or equal to the reference reflectivity value, the reflectivity value of HD2 that is the second block of the second illumination image is changed into zero. In addition, an average value of the reflectivity value of HD1 that is the second block of the first illumination image, the reflectivity value of HD2 that is the second block of the second illumination image, and the reflectivity value of HD4 that is the second block of the fourth illumination image is reflected to HD3 that is the second block of the third illumination image.

In addition, through the composite image generation module 360, the first block correction image G1 and the second block correction image G2 are combined to generate a combined image H.

Moreover, in addition to the aforementioned characteristics, the controller 30 is provided as a computer so that an illumination sequence for the plurality of illumination modules may be freely adjusted, and the luminance of each of the first to fourth illumination modules may be adjusted in a pulse width modulation (PWM) method. In addition, since the luminance of illumination may be different depending on angles of illumination according to characteristics of an inspection object, illumination values obtained by illuminating the inspection object A are managed so that standardized inspection results may be obtained.

Hereinafter, referring to FIGS. 8 to 14D, the operation of the non-Lambertian surface inspection system for line scan is described in detail.

Figure 8:
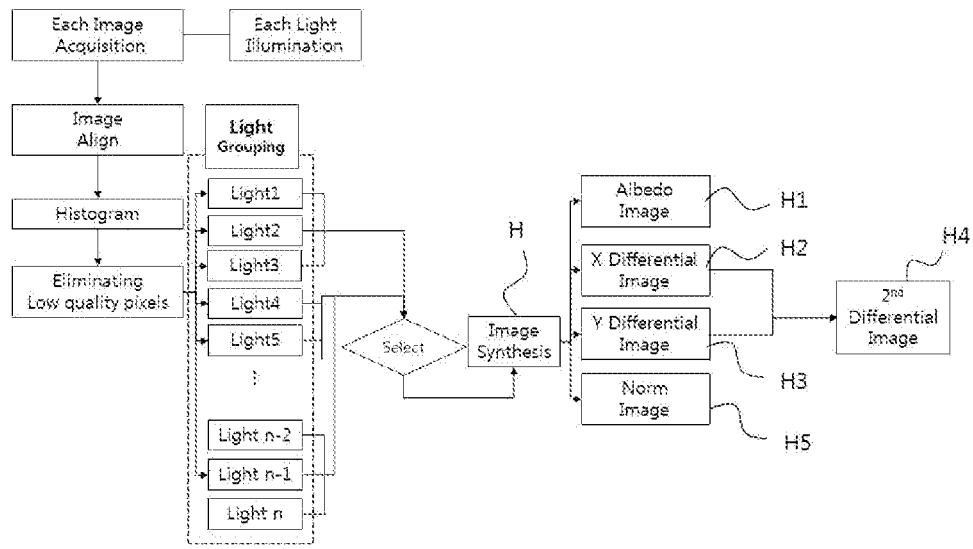
FIG. 8 is a flowchart illustrating operation of the non-Lambertian surface inspection system for line scan according to the exemplary embodiment of the present invention.

FIG. 8 is a flowchart illustrating the operation of a non-Lambertian surface inspection system for line scan according to the exemplary embodiment of the present invention, and FIGS. 9 to 13 are views illustrating an operation process and images appearing in the operation process of the non-Lambertian surface inspection system for line scan according to the exemplary embodiment of the present invention. In addition, FIGS. 14A to 14D are views illustrating a plurality of block correction images.

As shown in FIG. 8, the controller 30 operates in a series sequence so as to generate processed images, that is, an albedo image H1, a partial differential image H2 in the X direction, a partial differential image H3 in the Y direction, a second partial differential image H4, and a normal vector image (i.e., norm image).

Figure 9:
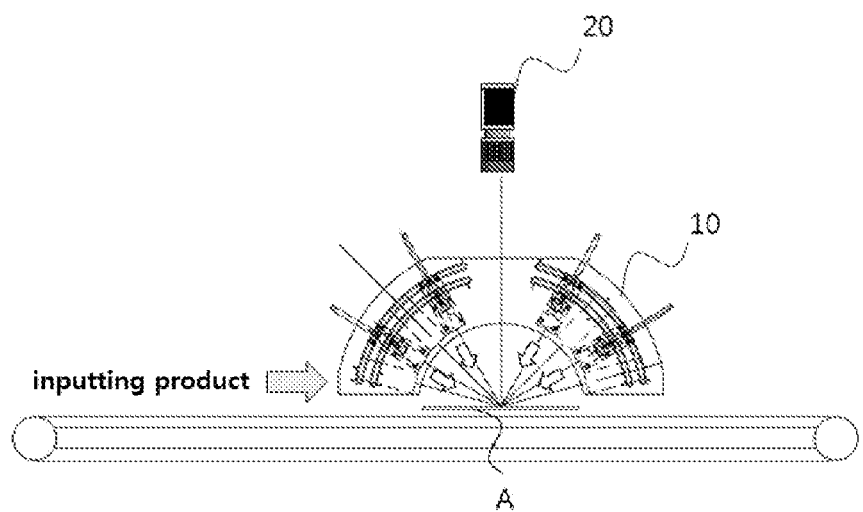
FIGS. 9 to 13 are views illustrating an operation process and images appearing in the operation process of the non-Lambertian surface inspection system for line scan according to the exemplary embodiment of the present invention.
Figure 10:
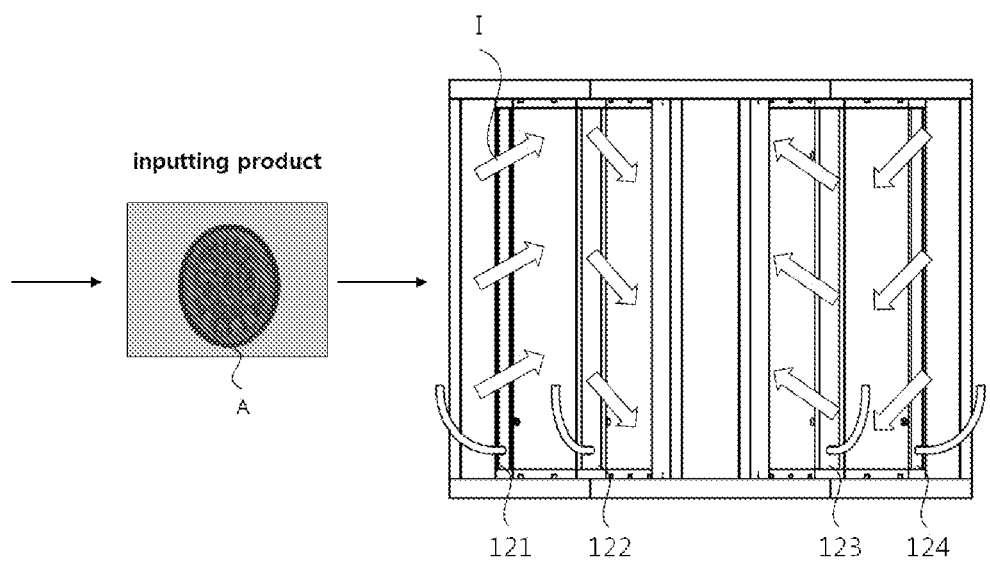

More specifically, as shown in FIG. 9, when the inspection object A enters the surface inspection part 10, the controller 30 operates the plurality of illumination modules in sequence, so as to generate the plurality of illumination images through the camera part 20. In this case, the first illumination module 121 to the fourth illumination module 124 emit light to the inspection object A in directions I different from each other as shown in FIG. 10. The controller 30 may receive the entire reception image C in response to the operation of the first illumination module 121 to the fourth illumination module 124. In addition, partial images D1 to D4 of the plurality of rows or columns are extracted from the received entire reception image C, and each extracted partial image is aligned to generate the first illumination image E1 to the fourth illumination image E4.

As shown in FIG. 13, the controller 30 divides each illumination image into a plurality of blocks, extracts a reflectivity value from each divided block, and compares the reflectivity value of each extracted block with a preset reference reflectivity value. Here, the histogram module 330 of the controller 30 divides the first illumination image E1 to the fourth illumination image E4 into each block F and assigns a position number to each block F, and extracts a reflectance value from each block. In addition, a curve graph corresponding to the reflectivity values may be generated.

Moreover, each block F generated by the histogram module 330 may be a pixel, and the reflectivity value contained in each block may be extracted as 0 to 255.

In this case, the histogram module 330 may extract the reflectivity value in the following method on the basis of the illustrated symbols. In this case, the unit vector toward each illumination module 12 becomes L=(cos τ·sin σ, sin σ·sin τ, cos σ). In addition, the normal unit vector of a point (x, y) on a surface of an inspection object A becomes $$N = \left[ \frac{p}{\sqrt{p^2+q^2+1}}, \frac{q}{\sqrt{p^2+q^2+1}}, \frac{1}{\sqrt{p^2+q^2+1}} \right].$$

In addition, when the surface is partially differentiated at the point (x, y) of the surface of the inspection object along the x axis and the y axis, $$p = \frac{\partial s(x, y)}{\partial x}$$

$$q = \frac{\partial s(x, y)}{\partial y}$$

is obtained.

Here, σ is a slant angle of illumination and τ is a tilt angle of the illumination. ρ is a constant of a surface. In addition, λ is intensity of the illumination. The intensity of an image in the coordinates of an image may be $$i(x, y) = \rho\lambda(n \cdot L) = \rho\lambda \frac{-p\cos\tau \cdot \sin\sigma - q\sin\tau \cdot \sin\sigma + \cos\sigma}{\sqrt{p^2+q^2+1}}.$$

In this case, the removal module 340 of the controller 30 includes a reference reflectivity value so as to compare the reference reflectivity value and a reflectivity value measured in each block F. In addition, the removal module 340 deletes a block F having a reflectivity value greater than the reference reflectivity value. For example, the removal module 340 includes a reflectivity value corresponding to a numeric value of 254 as a reference reflectivity value and deletes the block F having a reflectivity value greater than the reference reflectivity value.

As such, the controller 30 leaves a block when a reflectivity value of the block is less than the reference reflectivity value, deletes a block when a reflectivity value of the block is greater than or equal to the reference reflectivity value, and merges a block corresponding to a position of the deleted block due to having the reflectivity value exceeding the reference reflectivity value with blocks extracted from other illumination images by an interpolation method. Alternatively, when the reflectivity value of a block is greater than or equal to the reference reflectivity value, the block is deleted, and maps a block corresponding to a position of the deleted block due to having the reflectivity value exceeding the reference reflectivity value with the blocks extracted from other illumination images.

In addition, the controller 30 corrects a part of the block by the interpolation method, and generates again the first block correction image G1, the second block correction image G2, the third block correction image G3, and the fourth block correction image G4.

Figure 14A:
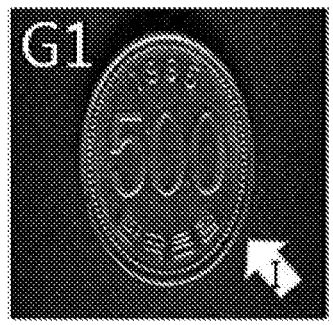
FIGS. 14A to 14D are views illustrating photographed images and a plurality of block correction images.
Figure 14B:
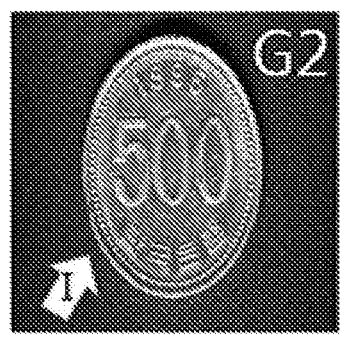
Figure 14C:
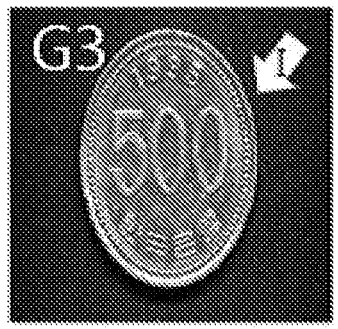
Figure 14D:
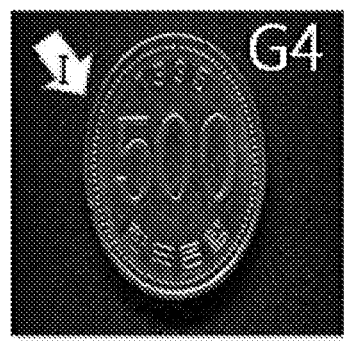

Here, as shown in FIG. 14A, the first block correction image G1 may be an image photographed by the light emitted from the first illumination module 121 or an image with some blocks thereof corrected after being photographed. In addition, as shown in FIG. 14B, the second block correction image G2 may be an image photographed by the light emitted from the second illumination module 122, or an image with some blocks thereof corrected after being photographed. In addition, shown in FIG. 14C, the third block correction image G3 may be an image photographed by the light emitted from the third illumination module 123, or an image with some blocks thereof corrected after being photographed. In addition, shown in FIG. 14D, the fourth block correction image G4 may be an image photographed by the light emitted from the fourth illumination module 124, or an image with some blocks thereof corrected after being photographed.

In addition, the composite image generation module 360 may process a composite image H into an albedo image H1, process the composite image H into an X-axis partial differential image H2 by calculating a change amount of a surface height of the inspection object in the X-axis direction in the composite image H, process the composite image H into a Y-axis partial differential image H3 by calculating the change amount of the surface height of the inspection object in the Y-axis direction in the composite image H, or process the X-axis partial differential image and the Y-axis partial differential image into a second partial differential image H4 in which the change amounts of the surface height of the inspection object is calculated in the X-axis direction and the Y-axis direction.

More specifically, the composite image generation module 360 may obtain the albedo image H1 from the composite image through the following equation.

$$\begin{bmatrix} I_1 \\ I_2 \\ I_3 \\ \vdots \\ I_n \end{bmatrix}_{Image} = \rho \begin{bmatrix} L_1^T \\ L_2^T \\ L_3^T \\ \vdots \\ L_n^T \end{bmatrix}_{Light} N \Rightarrow \begin{array}{l} I = LN \\ L^T I = L^T L N \\ N = (L^T L)^{-1} L^T I \\ \rho = |N| = |(L^T L)^{-1} L^T I| \end{array}$$

In this case, the albedo image H1 may have the luminance due to scattered light excluding the luminance due to specular reflection occurred by the illumination onto the surface of the object.

In addition, as shown in FIG. 2, through the formula that calculates the change amount of the surface height of the inspection object in the X-axis direction, that is, through formula $$-\frac{\partial s(x, y)}{\partial x},$$

the composite image generation module 360 may obtain, from the composite image, a partial differential image H2 in the X-axis direction in which change characteristics of the surface height of the inspection object relative to the X-axis direction is prominent.

In addition, as shown in FIG. 2, through the formula that calculates the charge amount of the surface height of the inspection object in the Y-axis direction, that is, through formula $$-\frac{\partial s(x, y)}{\partial y},$$

the composite image generation module 360 may obtain, from the composite image, a Y-axis partial differential image H3 in which the change characteristics of the surface height of the inspection object in the Y-axis direction is prominent. In addition, as shown in FIG. 2, through a formula for calculating the change amount of the surface height of the inspection object in the obtained image, that is, through formula $$H = \begin{pmatrix} \frac{\partial^2 s(x, y)}{\partial x^2} & \frac{\partial^2 s(x, y)}{\partial x \partial y} \\ \frac{\partial^2 s(x, y)}{\partial x \partial y} & \frac{\partial^2 s(x, y)}{\partial y^2} \end{pmatrix},$$

the composite image generation module 360 may obtain a curvature image in which an expression of the curvature characteristics of the surface height of the inspection object is prominently displayed.

In addition, as shown in FIG. 2, through formulas for calculating a value in a direction perpendicular to the surface of the composite image H, that is, through formulas $$N = \left( -\frac{\partial s(x, y)}{\partial x}, -\frac{\partial s(x, y)}{\partial y}, 1 \right)$$

and $$n = \frac{N}{|N|} = \frac{\left( \frac{\partial s(x, y)}{\partial x}, \frac{\partial s(x, y)}{\partial y}, 1 \right)}{\sqrt{\left( \frac{\partial s(x, y)}{\partial x} \right)^2 + \left( \frac{\partial s(x, y)}{\partial y} \right)^2 + 1}},$$

composite image generation module 360 may obtain a norm image in which light received perpendicular to the surface is converted to an image.

In addition, the controller 30 measures, in real time in three or more combinations, illumination of light directly entering the camera part 20 due to total reflection in light source directions 1 to n shown in FIG. 7, and excludes the measured values when synthesizing the images, so that the overall image quality is improved.

The non-Lambertian surface inspection system 1 for line scan generates an albedo image H1, an X-axis partial differential image H2, a Y-axis partial differential image H3, a second partial differential image H4 obtained by secondarily differentiating a norm image and a curvature image, and an inspection image, so as to enable accurate inspection of irregular surfaces and non-Lambertian surfaces of the inspection object.

Figure 15:
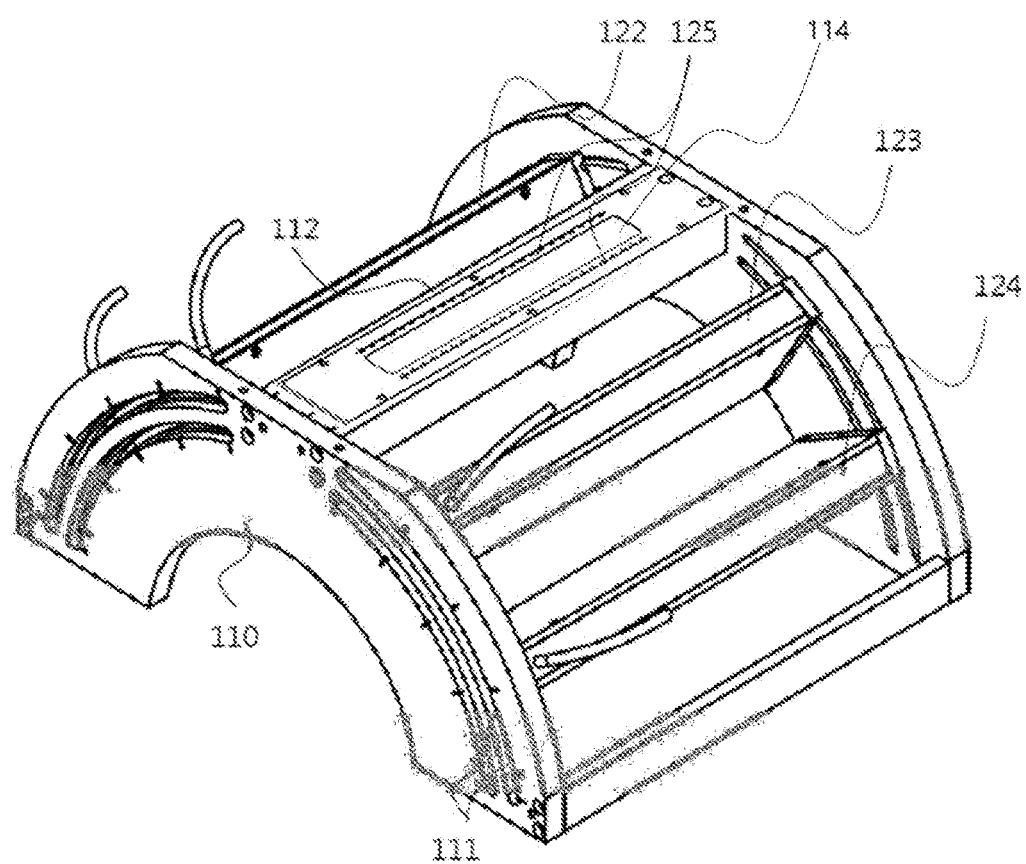
FIG. 15 is a perspective view illustrating a state in which a light-transmission plate is installed on the frame module.
Figure 16:
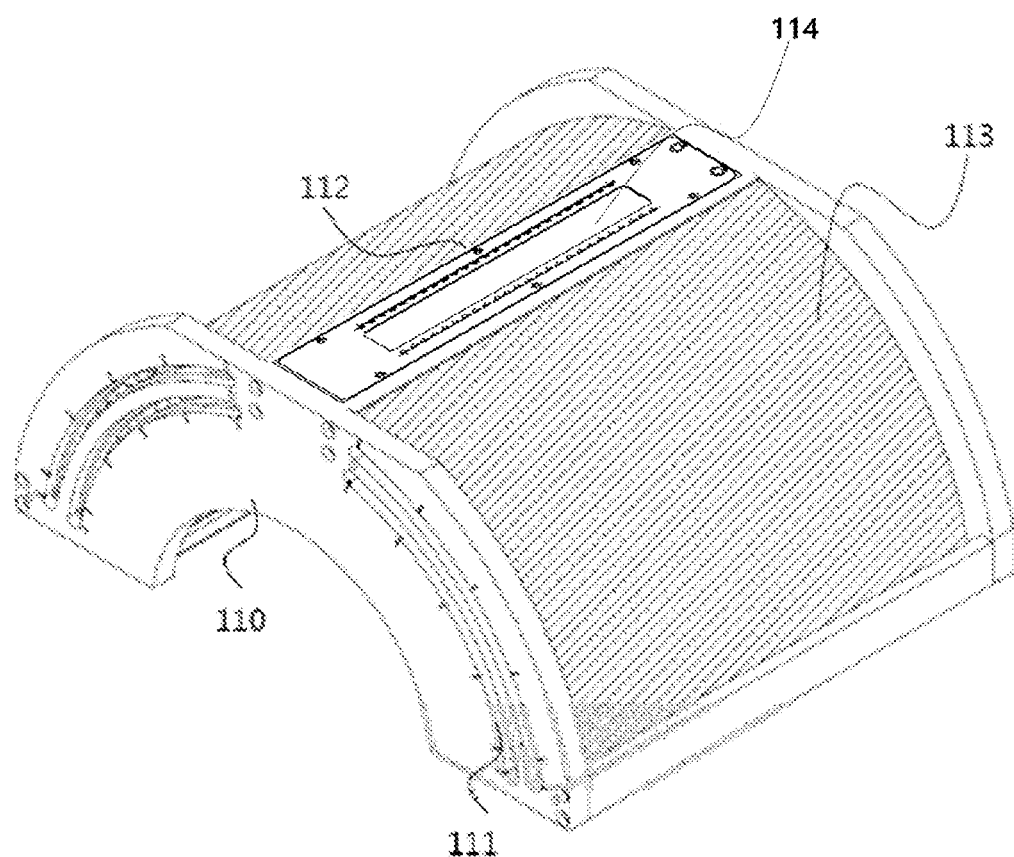
FIG. 16 is a perspective view illustrating a state in which the light-transmission plate and the reflection plate are installed on the frame module.
Figure 17:
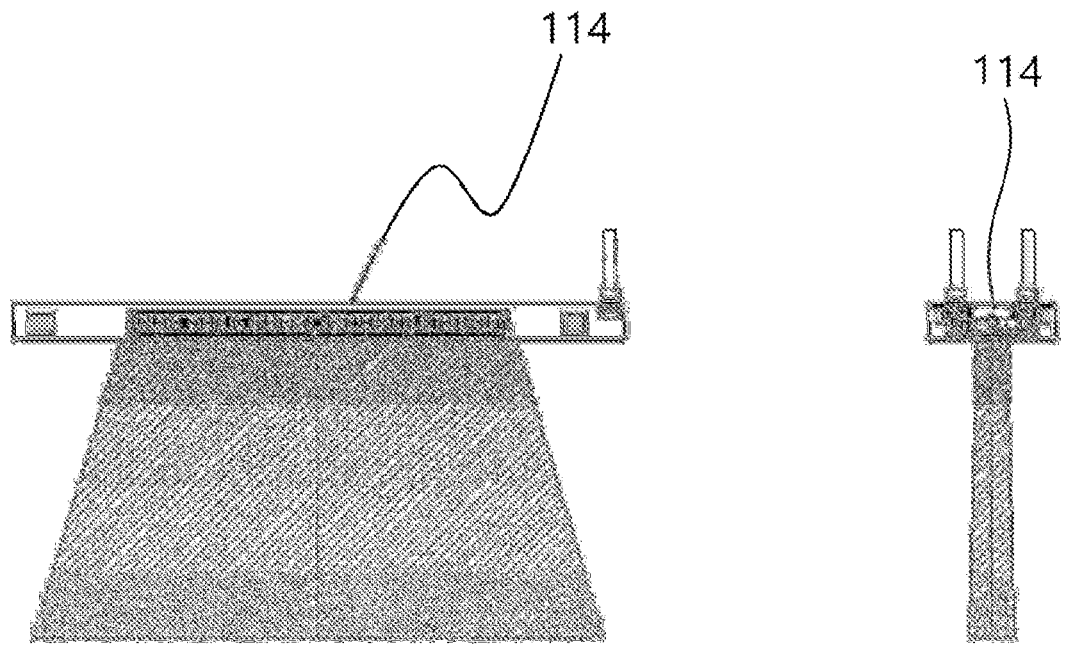
FIG. 17 is a front view and a side view illustrating a state in which scattered light is emitted through the light-transmission plate.
Figure 18:
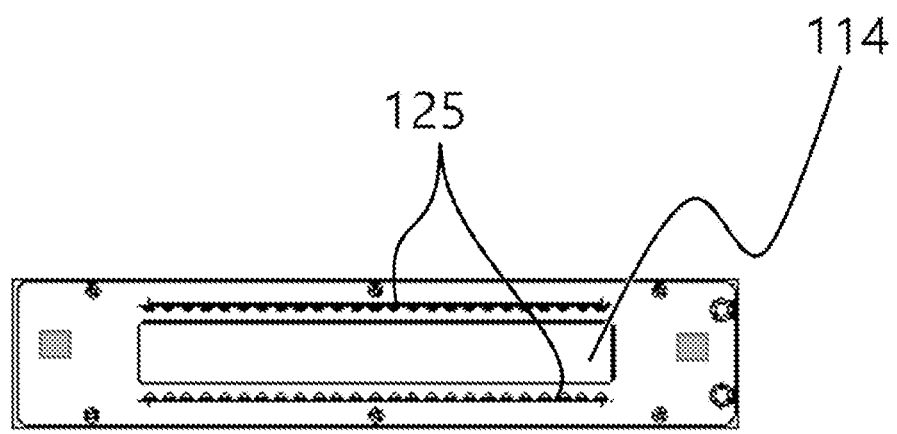
FIG. 18 is a plan view illustrating the light-transmission plate.

FIG. 15 is a perspective view illustrating a state in which a light-transmission plate is installed on the frame module, FIG. 16 is a perspective view illustrating a state in which the light-transmission plate and the reflection plate are installed on the frame module, FIG. 17 is a front view and a side view illustrating a state in which scattered light is emitted through the light-transmission plate, and FIG. 18 is a plan view illustrating the light-transmission plate.

Referring to FIGS. 15 to 18, the frame module 110 of the non-Lambertian surface inspection system 1 for line scan further includes a light-transmission plate 114 and auxiliary illumination modules 125.

The light-transmission plate 114 is installed at a position in the photographing hole 112 and a dot pattern for reflecting light downward is formed on the upper surface of the light-transmission plate 114.

A plurality of auxiliary illumination modules 125 is installed on sides of the light-transmission plate 114 to emit light into the light-transmission plate 114.

Here, in each auxiliary illumination module 125, the luminance is adjusted through the controller 30.

Compared to a method of indirectly and passively using reflected and scattered light through a conventional frame module 110 having a dome shape, such a structure of the present invention reduces the size of the frame module effectively while controlling strength (i.e., intensity) of scattered light separately, thereby enabling the noise control of surface inspection images more efficiently.

Noise in the surface inspection image includes: dark current noise that is generated by a camera sensor in low-light conditions; and shot noise (i.e., spatial noise) that is caused by fine non-uniform characteristics of a surface of a product.

When the reflected light on the surface of the product is too low, the overall image becomes dark, and the low-light sensitivity of a sensor is weakened, so the generated dark current noise requires light of a vertical component with a predetermined luminance or higher.

Through balanced scattered light, it is possible to reduce the dark current noise by supplementing the light in the vertical direction.

In addition, when scattered light is exposed with an excessive difference in a finely polished state or fine defects (within one to two µm) on the surface of the product, the scattered light acts like spatial noise that makes it difficult to detect surface defects (i.e., flaws and scratches of 10 µm or more) to be inspected. Such noise elements are canceled through illumination of the balanced scattered light, so that it is possible to express a noise-free image.

Therefore, in the case of the present invention, noise may be removed by using active-type scattering light in obtaining an albedo (i.e., reflectance) image of a surface, and separately isolated active scattering light may be adjusted, so that there is little effect on a curvature (i.e., radius of curvature or differentiation) image.

In this way, a good image may be obtained for surface inspection.

In scattering of light according to Mie scattering, the light is scattered when the light is emitted to an irregular surface of a certain size or less, and is not scattered when particles are similar to the wavelength of the light or less than the certain size.

The intensity of scattered light depends on an angle of incidence of the light.

The accurate calculation of surface roughness of an inspection object may be calculated by using Maxwell's equation.

When incident light is scattered on a surface of an inspection object, particle density M and luminance of the scattered light satisfy the following equation.

$$M = \sum_k \frac{4\pi^3 \gamma^2 \rho \left(\frac{l_k}{l_{k0}}\right)}{3\lambda_k^2 vS \sum_i \{l_{k1}(n,\theta) + l_{k2}(n,\theta)m\alpha(D_1)\}} \Delta D_i$$

(where $\gamma$ is a distance between a camera and an inspection object, $\rho$ is density of small particles on a surface, $l_k$ is luminance of a scattered wavelength k, $l_{k0}$ is luminance of incident light of the wavelength k, $\lambda_k$ is the wavelength k of the incident light, and S is a surface area of the inspection object.)

In addition, $l_{k1}$ and $l_{k2}$ respectively represent vertical and horizontal polarization components of scattered light, which are functions related to a refractive index n of the inspection object and a scattering angle $\theta$.

$\alpha(D_i)$ is a surface particle distribution function of the inspection object, and m represents the number of various distribution functions.

The concentration of surface particles is linearly related to the luminance of scattered light.

The present invention is designed, from the above equations, to properly adjust luminance of the auxiliary illumination modules and a distance from the camera, which maximize a difference between the luminance of incident light scattered due to unique surface roughness of the inspection object and the luminance of the incident light due to surface defects.

When the surface of the inspection object is contaminated by welding, but not defective, or when the surface of the inspection object is curved and there is a stain on the surface, but is not separated as a defect, sometimes it is difficult to distinguish normal surfaces from defects such as scratches or flaws on the surface.

In the present invention, images are obtained while changing the luminance of the auxiliary illumination modules, and the contamination due to welding, or the surface curvature and defects are distinguished and detected by using these images.

Figure 19A:
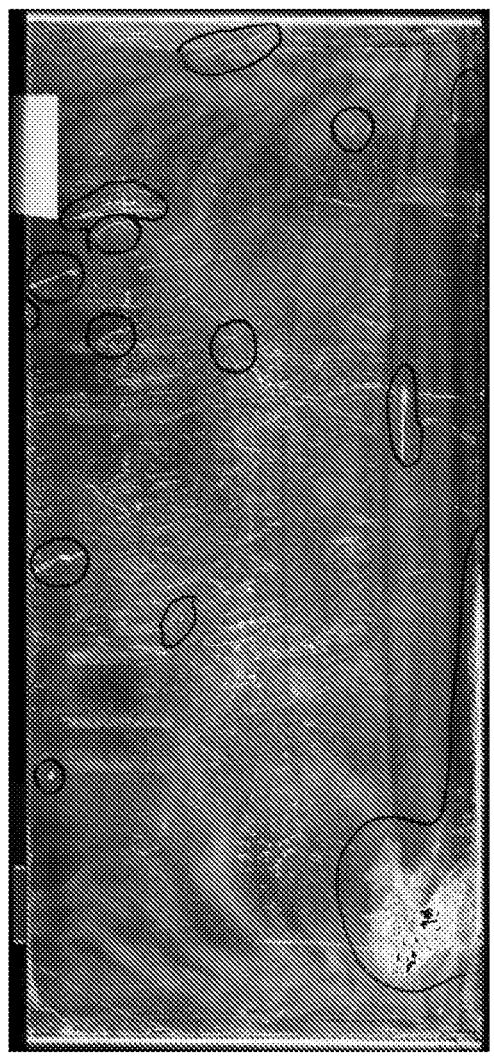
FIGS. 19A and 19B are exemplary views illustrating differences in images (i.e., left: no scattered light illumination, right: with scattered light illumination) according to whether or not the scattered light illumination is used.
Figure 19B:
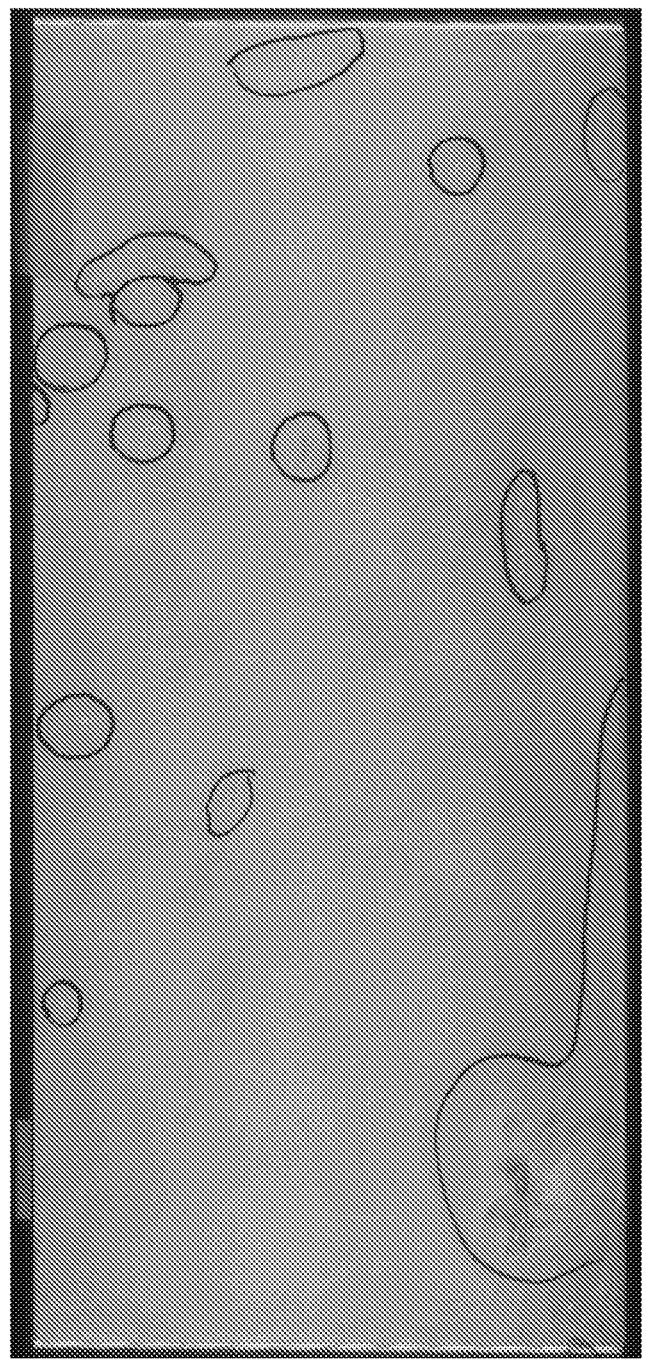

FIGS. 19A and 19B are exemplary views illustrating differences in images (i.e., FIG. 19A: no scattered light illumination, FIG. 19B: with scattered light illumination) according to whether or not the scattered light illumination is used.

The image of FIG. 19A is an image taken without a scattered light system, and the image of FIG. 19B is a result of synthesizing by using scattering light.

In the images of FIGS. 19A and 19B, a bright part is a scratch or a defect, and a dark part is the surface of the inspection object.

Although there is little change in the luminance of the images in FIGS. 19A and 19B, the luminance of the surface of the inspection object becomes brighter as the illumination of the auxiliary illumination modules becomes brighter.

Therefore, the part with little change in the luminance of illumination is separated as a defect (i.e., scratch or flaw) to be expelled.

In principle, when a size of surface particles of an inspection object is within a range of Mie Scattering, the surface luminance of the inspection object has a linear relationship with the luminance of auxiliary illumination modules, but the case where the size of the surface particles is larger than the range of Mie Scattering (for example, defects such as scratches or flaws) has little to do with the luminance of the auxiliary illumination modules.

Figure 20:
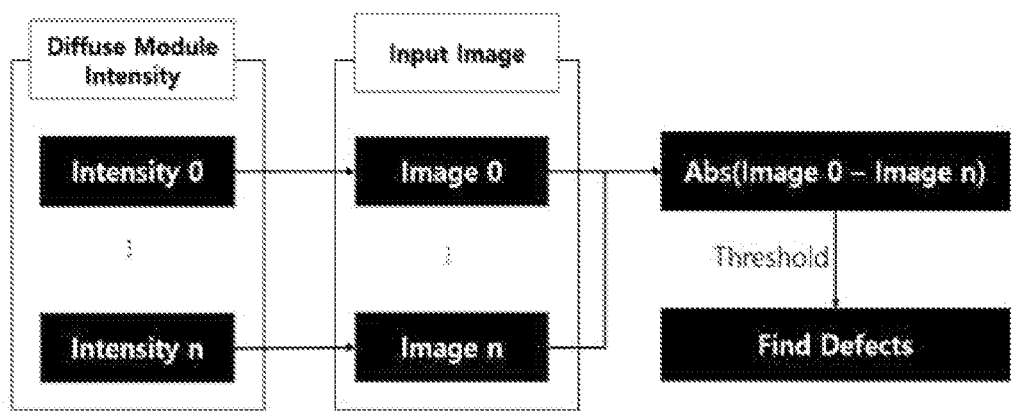
FIG. 20 is an exemplary view illustrating a process of detecting scratches and flaws.

FIG. 20 is an exemplary diagram illustrating a process of detecting scratches and flaws.

Referring to FIG. 20, after Image 0 is obtained from Intensity 0 of luminance of a diffuse module, and Image n is obtained from Intensity n, a difference between Image 0 and Image n is calculated, thereby detecting scratches and flaws from these images.

Figure 21A:
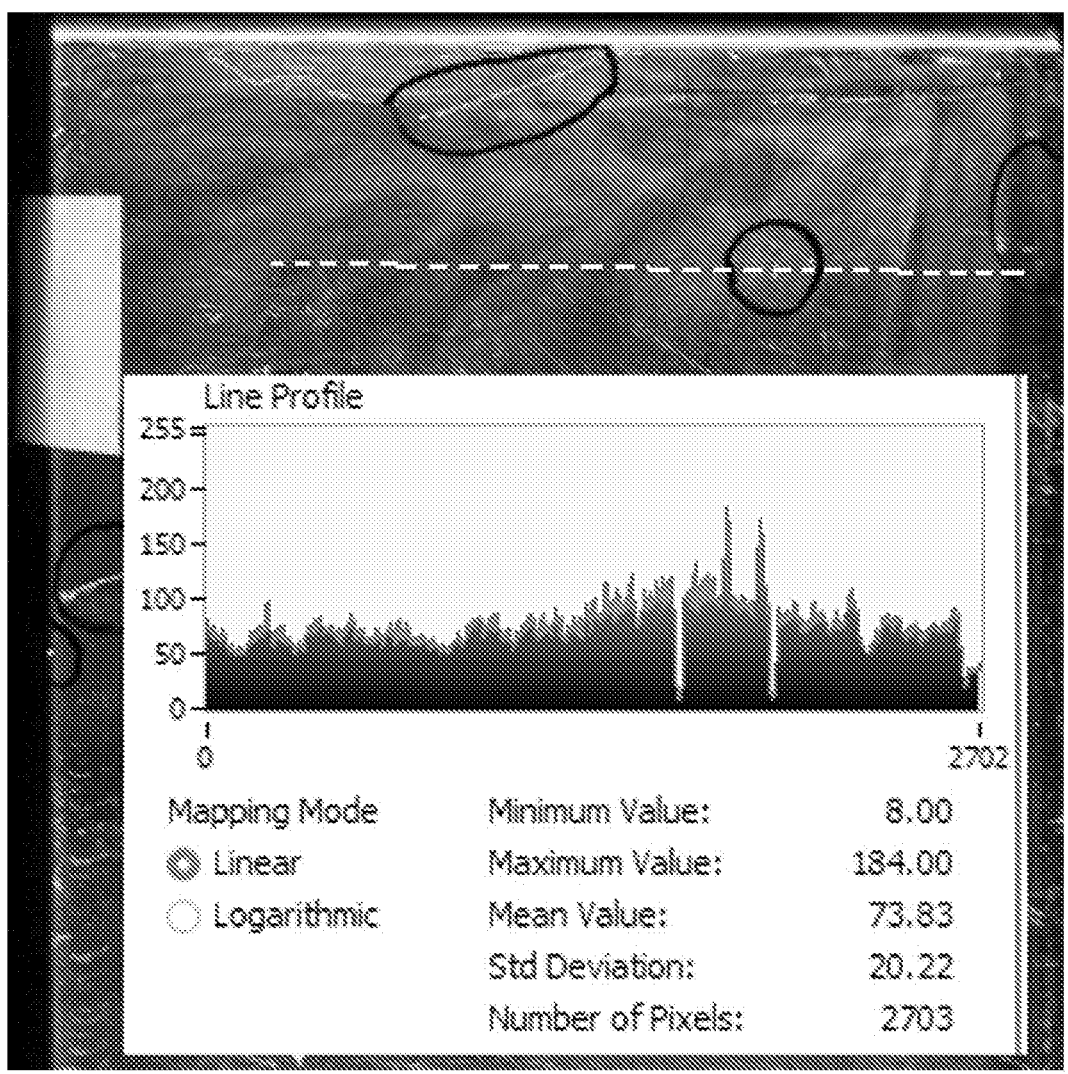
FIGS. 21A and 21B are surface profiles (i.e., left: severe noise, right: noise removed) according to presence or absence of the scattered light.
Figure 21B:
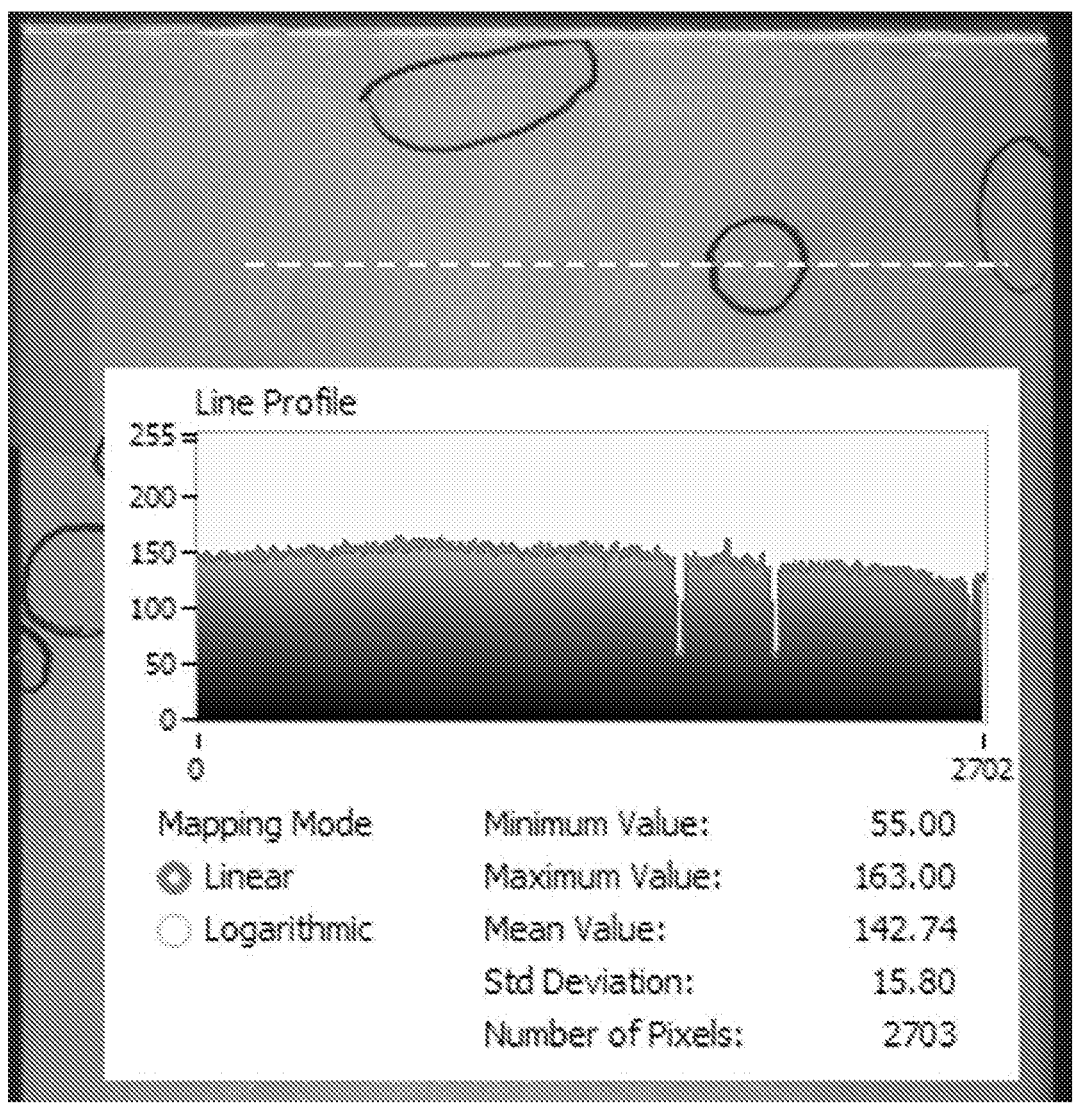

FIGS. 21A and 21B are surface profiles (i.e., FIG. 21A: severe noise, FIG. 21B: noise removed) according to presence or absence of the scattered light.

The dashed white line in FIGS. 21A and 21B is a profile of a corresponding image.

It may be seen that a standard deviation value is reduced from 20 to 15 in the profile of the image of FIG. 21B.

Figure 22A:
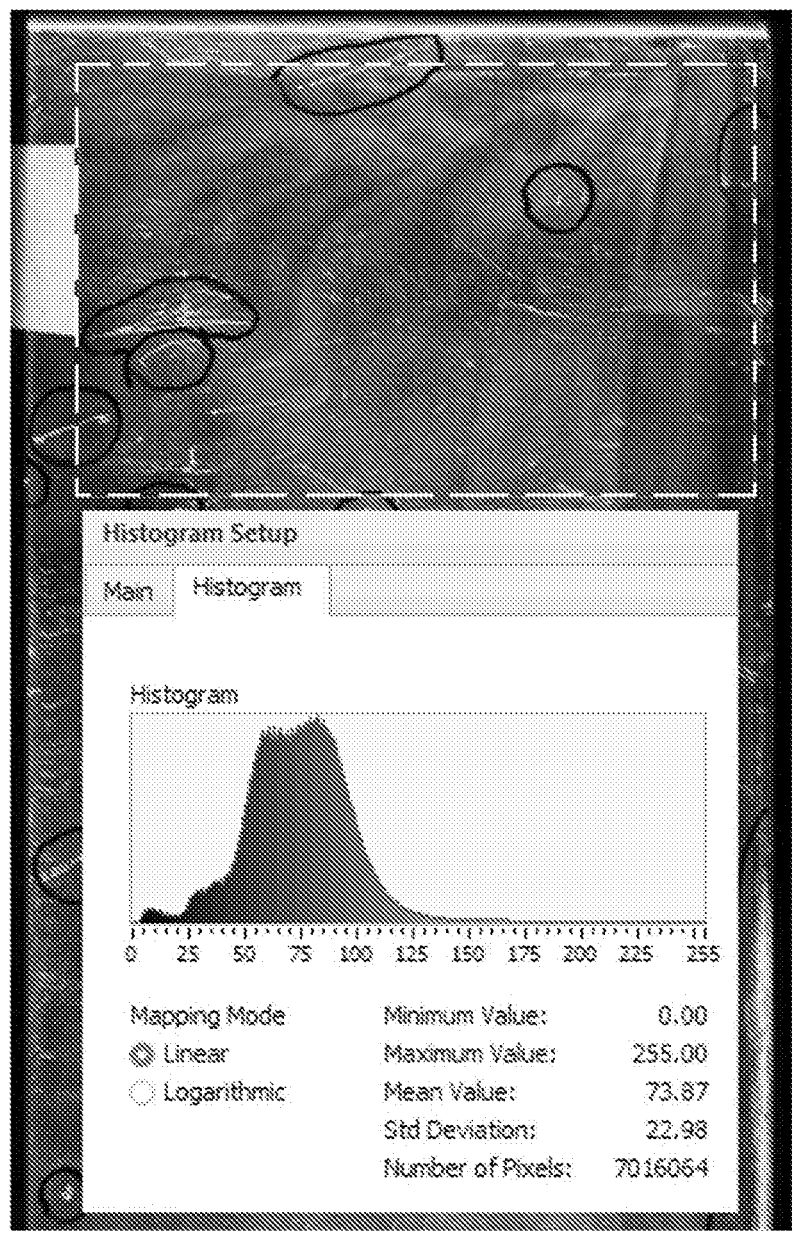
FIGS. 22A and 22B are histogram distribution (i.e., left: smoothed with high deviation, right: low smoothing, low deviation) of a surface according to whether the scattered light is present.
Figure 22B:
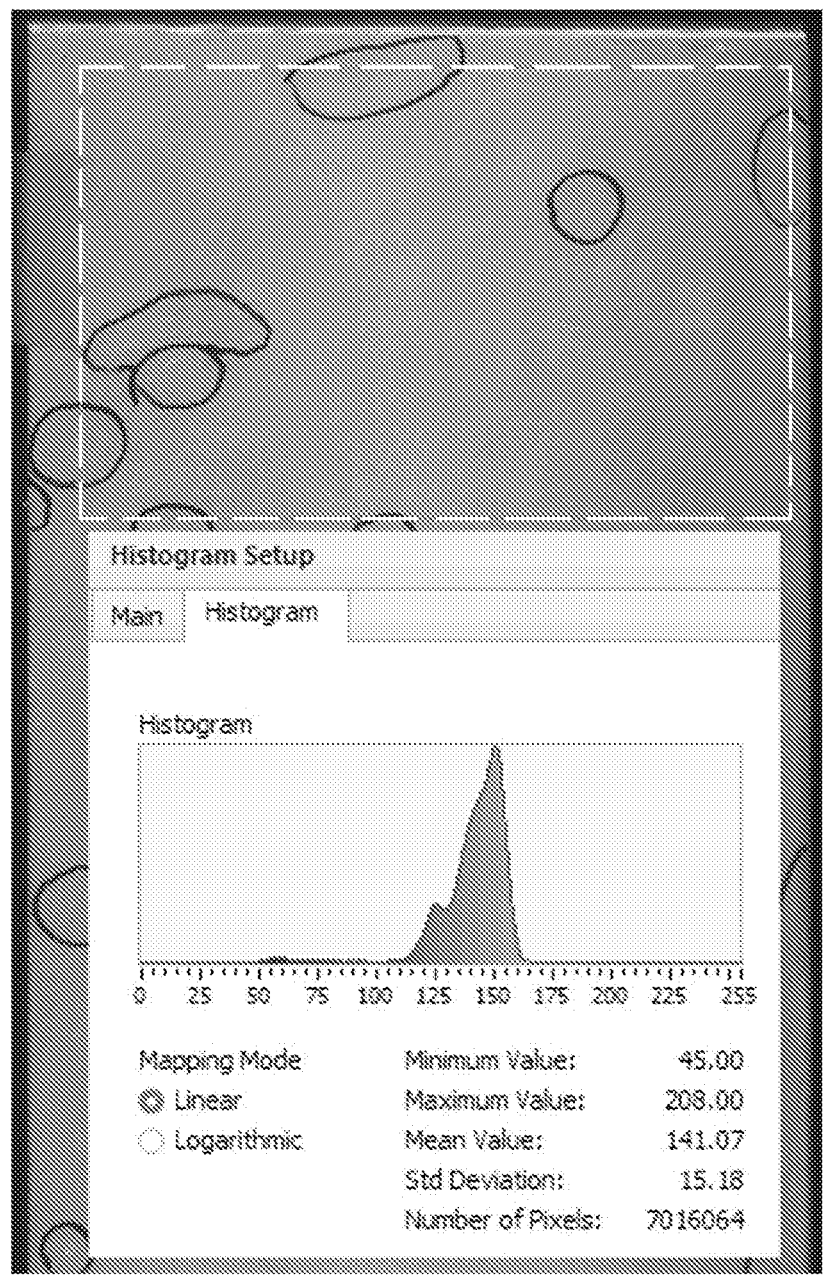

FIGS. 22A and 22B are histogram distribution (i.e., FIG. 22A: smoothed with high deviation, FIG. 22B: low smoothing, low deviation) of a surface according to whether the scattered light is present.

Referring to the histogram of the area in the dashed white line, it may be seen that the standard deviation value is reduced from 23 to 15 by dramatically reducing bottom noise information by using scattered light.

Although the exemplary embodiments of the present invention have been described above with reference to the accompanying drawings, it will be understood that those skilled in the art to which the present invention pertains may implement the present invention in other specific forms without departing from the technologies or essential features thereof. Therefore, the exemplary embodiments described above are to be understood in all respects as illustrative and not restrictive.

What is claimed is:
1. A non-Lambertian surface inspection system for line scan, the system comprising:
   a surface inspection part (10) comprising a frame module (110) provided with a curved mounting hole (111) formed on at least one of one surface and the other surface thereof and a photographing hole (112) formed at an upper end thereof, and a plurality of first and second illumination modules (121) and (122) installed in the mounting hole (111) and output light in oblique lines toward an inspection object (A) placed on a bottom surface thereof;
   a camera (20) positioned above the photographing hole (112), and configured to photograph the inspection object (A) positioned on the bottom surface (B) through the photographing hole (112) and receive an entire reception image (C) comprising a first illumination image (E1) and a second illumination image (E2); and
   a controller (30) configured to control operation of the camera (20), selectively operate the first illumination module (121) and the second illumination module (122), extract the first illumination image (E1) and the second illumination image (E2) from the entire reception image (C) photographed by the camera (20), and generate composite images (H1 to H4),
   wherein the controller (30) is configured to turn on the first illumination module (121) for a preset time and then turn off the first illumination module (121), turn on the second illumination module (122) when the first illumination module (121) is turned off, receive the first illumination image (E1) photographed through the camera (20) when the first illumination module (121) is turned on, and receive the second illumination image (E2) photographed through the camera (20) when the second illumination module (122) is turned on, the controller (30) comprises:
an illumination image reception module (310) configured to receive the first illumination image (E1) and the second illumination image (E2), which are photographed by the camera (20), into areas of preset rows or columns;
an alignment module (320) configured to align a partial image (D1) of a plurality of rows or columns of the first illumination image (E1) with a partial image (D2) of the plurality of rows or columns of the second illumination image (E2);
a histogram module (330) configured to divide the first illumination image (E1) and the second illumination image (E2) into a plurality of blocks (F), assign a position number to each block (F), and extract a reflectivity value of each block;
a removal module (340) configured to compare a preset reference reflectivity value with the reflectivity value measured in each block (F), and delete each block (F) having the reflectivity value greater than the reference reflectivity value; and
a block correction image module (350) configured to receive each block in a same position as each deleted block (F) of the first illumination image (E1) from the second illumination image (E2) to generate a first block correction image (G1) by mapping the first illumination image (E1) when each block (F) having the reflectivity value greater than the reference reflectivity value in the first illumination image (E1) is deleted, and receive each block in the same position as each deleted block (F) of the second illumination image (E2) from the first illumination image (E1) to generate a second block correction image (G2) by mapping the second illumination image (E2) when each block (F) having the reflectivity value greater than the reference reflectivity value in the second illumination image (E2) is deleted,
the controller (30) further comprises a composite image generation module (360) configured to synthesize the first block correction image (G1) and the second block correction image (G2), so as to generate the composite images (H),
the composite image generation module (360) is configured to process the composite image (H) into an albedo image (H1) in a setting area of the composite image (H), process the composite image (H) into an X-axis partial differential image (H2) obtained by calculating a change amount of a surface height of the inspection object in an X-axis direction in the composite image (H), process the composite image (H) into a Y-axis partial differential image (H3) obtained by calculating a change amount of the surface height of the inspection object in a Y-axis direction in the composite image (H), or process the X-axis partial differential image (H2) and the Y-axis partial differential image (H3) into a second partial differential image (H4) obtained by respectively calculating the change amounts of the surface height of the inspection object in the X-axis direction and the Y-axis direction,
wherein the frame module (110) further comprises:
a light-transmission plate installed in the photographing hole (112) and provided with a dot pattern formed on the upper surface thereof and configured to reflect a light downward; and
a plurality of auxiliary illumination modules (125) installed on sides of the light-transmission plate (114) to emit the light to inside the light-transmission plate (114), wherein luminance of each auxiliary illumination module (125) is controlled through the controller (30).

2. The system of claim 1, wherein the frame module (110) is provided in a shape included in a hemispherical shape.

3. The system of claim 1, wherein the frame module (110) further comprises a reflection plate (113) installed on an upper surface thereof.

\* \* \* \* \*